United States Patent [19]

Ackeret

[11] 4,258,961

[45] Mar. 31, 1981

[54] MAGNETIC TAPE CASSETTE CONTAINER SUPPORT

[75] Inventor: Peter Ackeret, Künacht, Switzerland

[73] Assignee: IDN Inventions and Development of Novelties AG, Chur, Switzerland

[21] Appl. No.: 970,432

[22] Filed: Dec. 18, 1978

[30] Foreign Application Priority Data

Dec. 22, 1977 [DE] Fed. Rep. of Germany ....... 2757249
Nov. 21, 1978 [DE] Fed. Rep. of Germany ....... 2850387

[51] Int. Cl.³ ...................... A47B 81/06; B65D 81/02
[52] U.S. Cl. .................................... 312/111; 312/10; 312/214; 312/242; 206/387; 206/523; 248/160
[58] Field of Search ........... 312/111, 214, 242, 257 R, 312/245, 10; 211/41; 206/387, 805, 523; 248/160

[56] References Cited

U.S. PATENT DOCUMENTS

| | | | |
|---|---|---|---|
| 1,599,066 | 9/1926 | Rushmore | 248/160 |
| 1,668,595 | 5/1928 | McAuliffe | 312/242 |
| 2,450,722 | 10/1948 | Drije | 312/245 |
| 2,754,991 | 7/1956 | Hagerty et al. | 312/242 |
| 2,769,679 | 11/1956 | Wiseman | 312/214 |
| 3,306,689 | 2/1967 | Isaacson et al. | 312/214 |
| 3,487,913 | 1/1970 | Rohrbach | 206/523 |
| 3,584,822 | 6/1971 | Oram | 248/160 |
| 3,653,532 | 4/1972 | Mann | 312/214 |
| 3,752,551 | 8/1973 | Clark | 312/245 |
| 3,823,814 | 7/1974 | Lum | 206/805 |
| 3,851,762 | 12/1974 | Liblick | 206/805 |
| 4,014,438 | 3/1977 | O'Toole et al. | 312/10 |
| 4,089,412 | 5/1978 | Baugh | 206/805 |
| 4,148,454 | 4/1979 | Carlson et al. | 312/111 |

Primary Examiner—Victor N. Sakran
Attorney, Agent, or Firm—H. Dale Palmatier

[57] ABSTRACT

A support arrangement for a plurality of tape cassette containers stacked to form a block, the block being held together by a sheath of foamed plastic material stretched thereabout and leaving accessible front faces of the containers where cassettes may be inserted or removed. The sheath has means to permit easy mounting of the entire block with its sheath in a releasable manner on a holder which, in turn, has means to fasten it at the wall of a vehicle, the holder being flexible or provided with pivots permitting positional adjustment of the block for convenient handling.

26 Claims, 33 Drawing Figures

MAGNETIC TAPE CASSETTE CONTAINER SUPPORT

The invention relates to a support for a plurality of magnetic tape cassette containers, the containers being of a design permitting removal of the cassette at the container front side.

The support is primarily but not exclusively intended for mounting of a certain number of cassette containers with slide out carriers in a vehicle.

It is an object of the present invention to provide a cassette container support which is simple but has an appealing appearance adapted or adaptable to the vehicle design, the support being suited to combine a number of individual containers to a compact block wherein the containers are shockproved. On the other hand, the support should be easy to manufacture and versatile with regard to its mounting facilities, without requiring amendments in the design of the individual container.

The Solution contemplated by the invention is defined in patent claim 1. The subclaims defined individual features, improvements and embodiments of the principal solution set forth in claim 1, the implication of such subclaim features being explained in detail hereunder with reference to several embodiments of the support, the embodiments being illustrated in the accompanying drawings.

Figure 1:
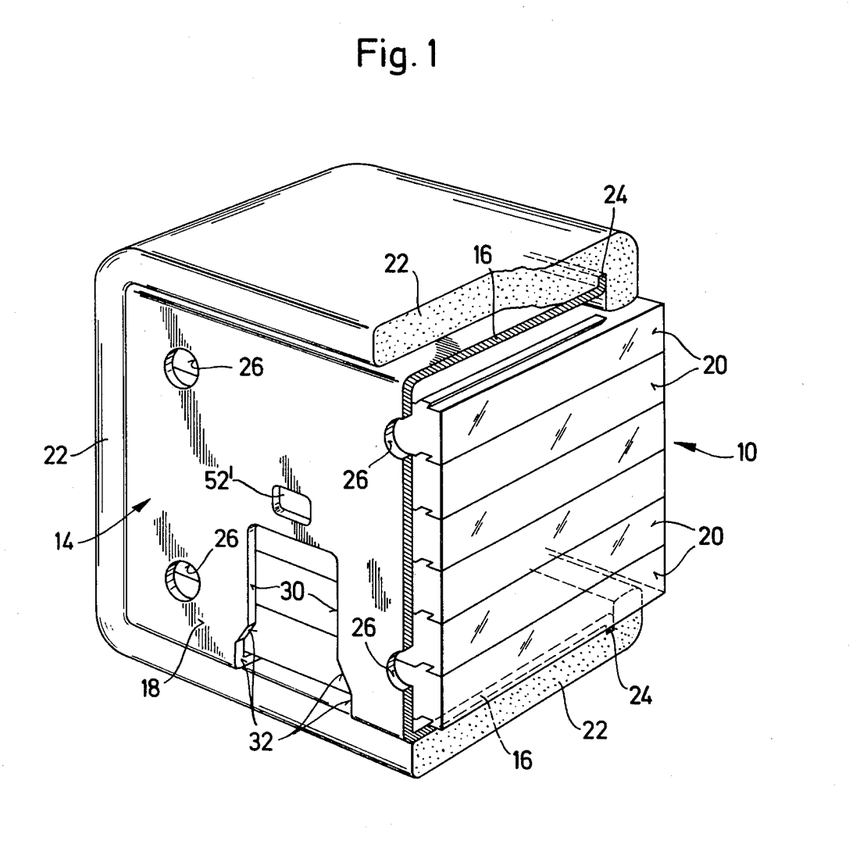
FIG. 1 shows a first embodiment of a support in an isometric view, partly in section.

The support illustrated in FIG. 1 serves to hold a number of, say, five cassette containers which form a block 10. Each container has a frontwards opening lid which is the front plate of a drawer on which the cassette is transported out of block 10. The support comprises a U-shaped member 14 with an upper and a lower U-leg 16 and a U-base 18, the latter being position at the rear side of block 10 opposite its front. A sheath 22 made of foamed plastics is stretched about upper and lower leg of member 14 and about the lateral faces of block 10, sheath 22 being fabricated separately—e.g. integrally molded or formed of a strip welded or glued in loop form—and having an outer skin adapted to the design of the respective ambient design, for example, that of a vehicle. Sheath 22 has dimensions such that it firmly engages and, if necessary, is somewhat strained so that its front edge is elastically drawn inwards engaging over the respective front edge of member 14 which is slightly bent upwards, the front edge of the sheath thereby holding block 10 together.

Figure 2:
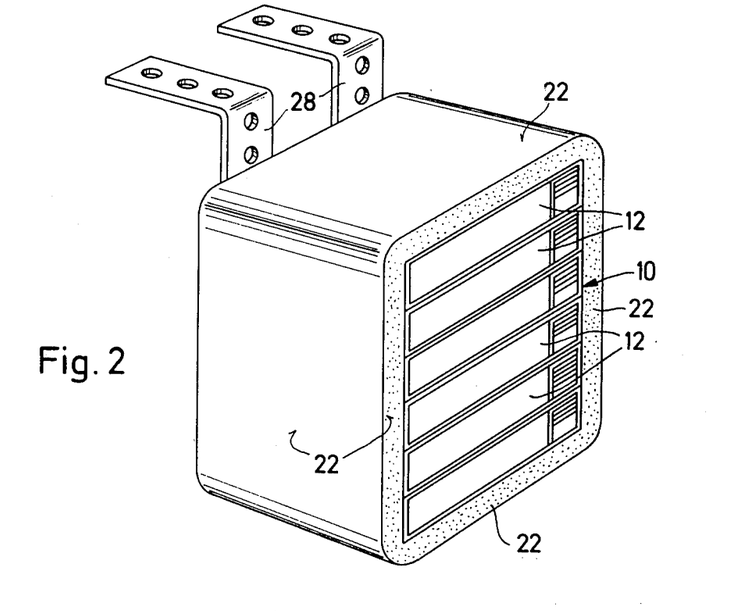
FIGS. 2 and 3 illustrate the support of FIG. 1 with its mounting brackets.
Figure 3:
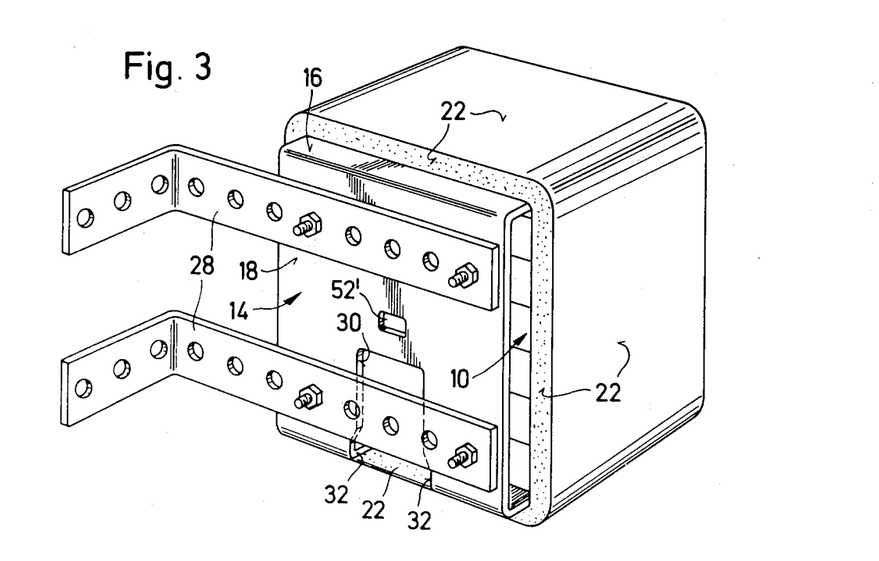

At the rear side of the support, the u-base of member 14 has mounting means. At first, it has four holes 26, preferably provided with screw threads so that brackets 28 may be fastened by means of screws in several positions (FIG. 2 and FIG. 3, respectively), the brackets in turn permitting mounting of the support in a vehicle in a manner frequently used for radio receivers. Further, the U-base is provided with a cut-out guide channel 30 having a somewhat widened inlet opening 32 adjacent the lower U-leg 16. Channel 30 serves the connection with a column 34 comprising a foot portion 36 apt to be fastened by screw bolts, a flexible center portion 38, and a carrier member 40 which may be rotatable with respect to center portion 38 and in turn comprises a carrier plate 42 slightly smaller than the bottom face of the support and a rearwardly upstanding holder plate 44.

Figures 4, 5:
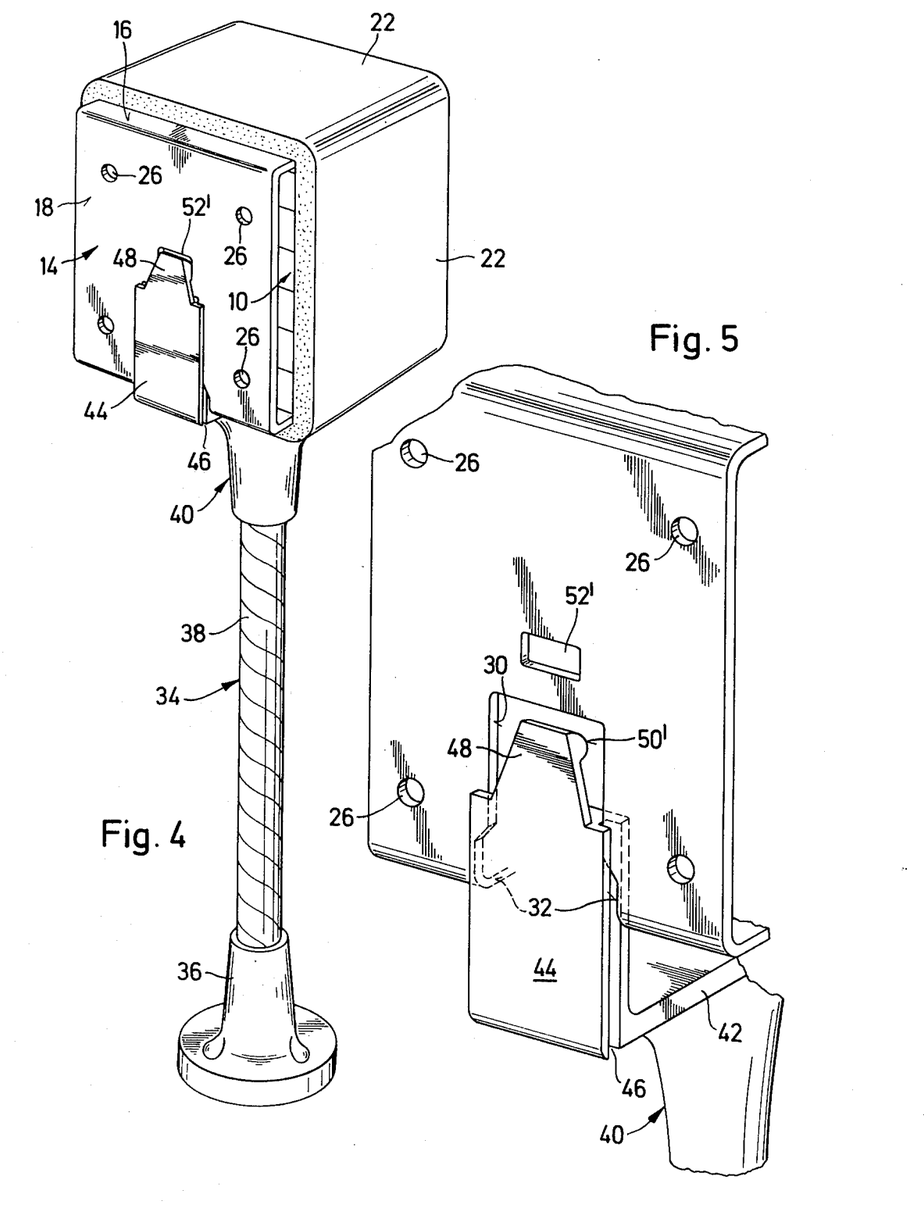
FIG. 4 illustrates the support of FIG. 1 with a support column.
FIG. 5 is a detailed view of the connection between support and column.

The latter has lateral groove profiles 46 complementary to the profile of channel 30 so that it may be pushed unto the holder plate. To eliminate vibration noise during vehicle movement, to the upper end of holder plate 44 a lug 48 having a protruding nose 50' is formed which resiliently snaps into an aperture 52' of the U-base and so secures the connection.

Figure 6:
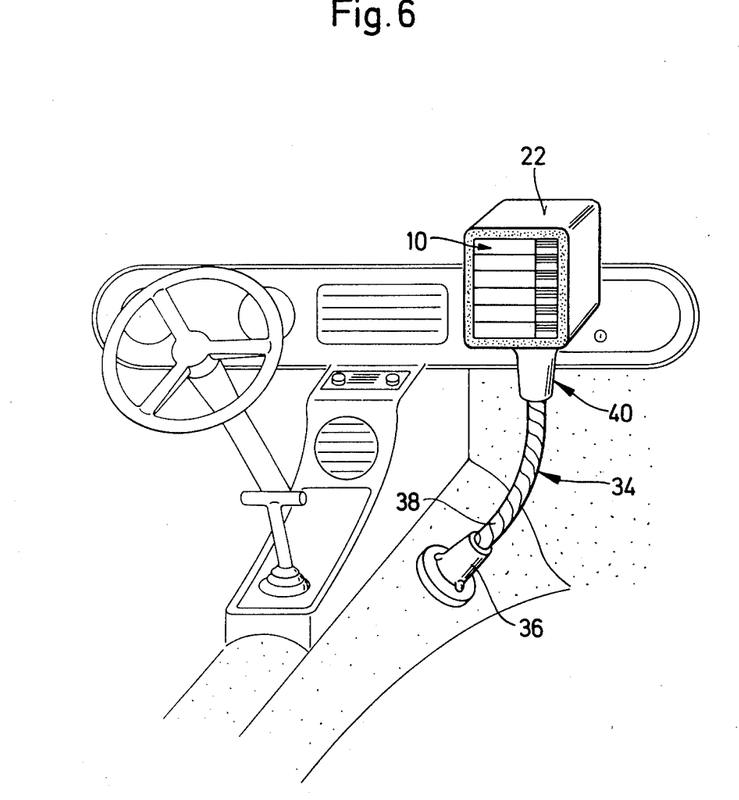
FIG. 6 shows the cockpit of a vehicle with the support arrangement of FIGS. 4 and 5.

FIG. 6 illustrates how the apparatus so combined may be mounted on the cardan tunnel of a vehicle by means of column 34, the flexible center portion of the column permitting positioning of the cassette containers in an easily accessible orientation; for this purpose, member 40 is rotatable but friction braked on center portion 38.

Figure 7:
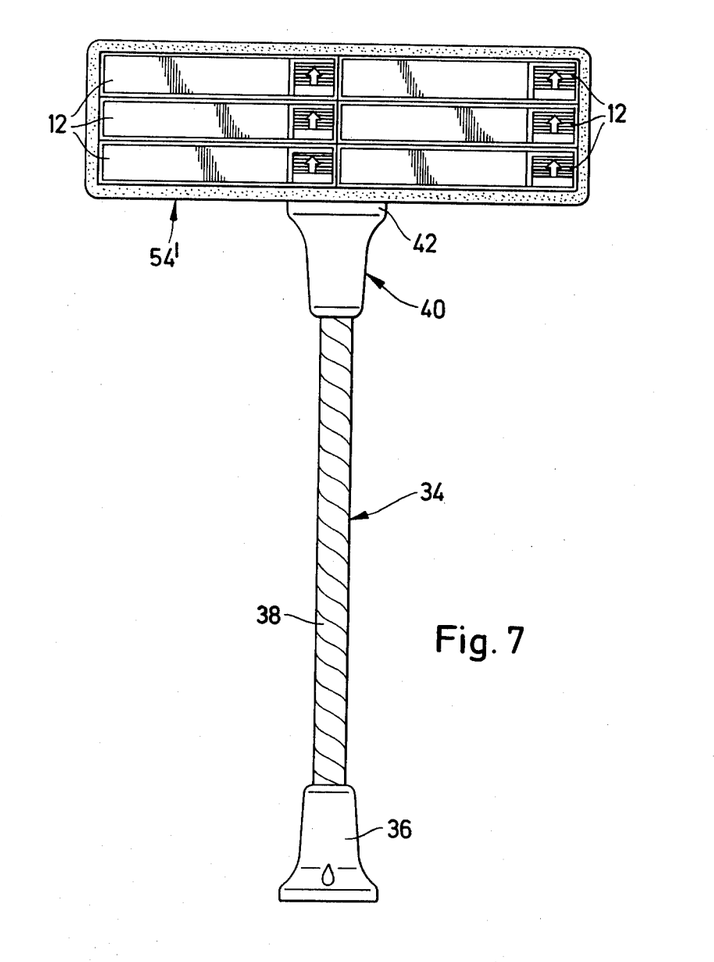
FIG. 7 is a front view of a second embodiment of a support.

In the embodiment shown in FIG. 7 sheath 54' combines six containers to a block. While the cassette containers referred to above are vertically stackable, i.e. may be combined to blocks, in this embodiment two sets of three containers each are held together by the sheath only. It will be understood, however, that the vertical mounting held by the sheath alone is possible, too, provided the containers are not inherently designed to have stacking means.

Figures 8, 8A, 8B:
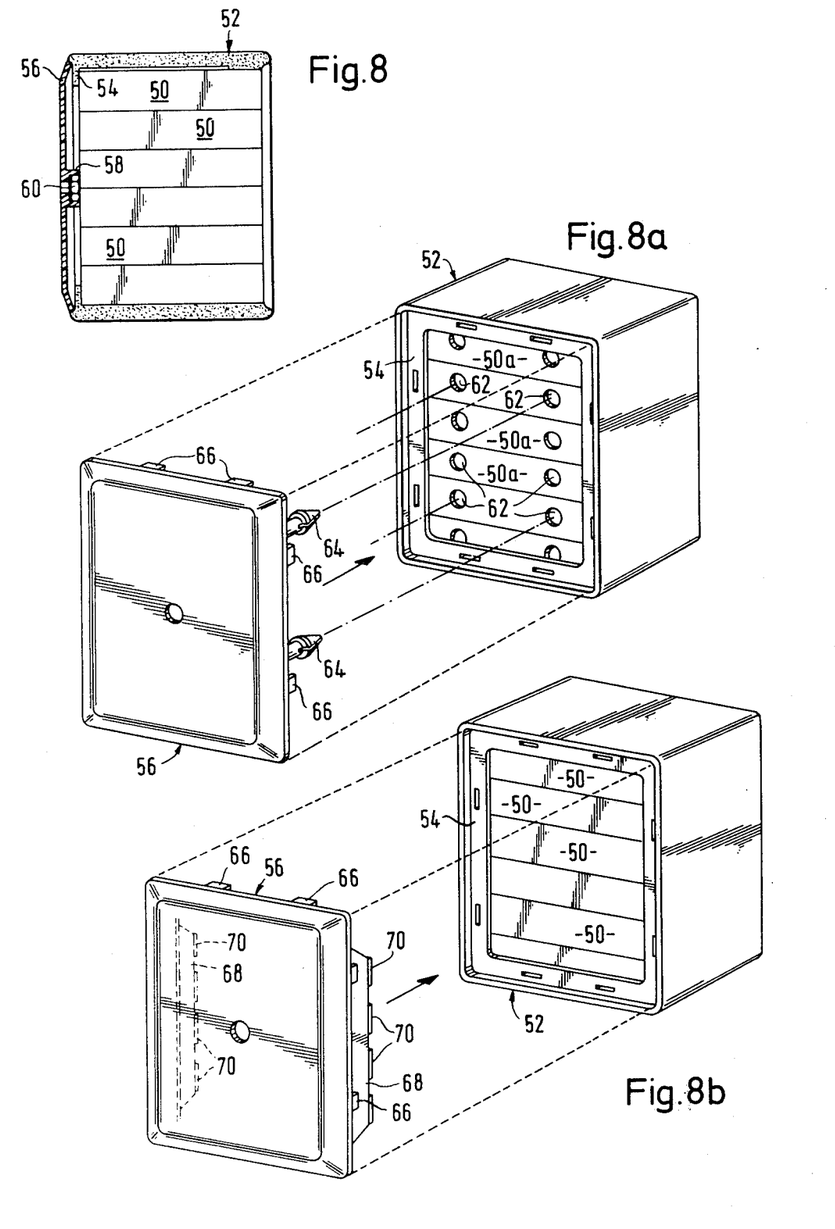
FIG. 8 is a vertical section of a third embodiment of a support which, in front view, would look similar to FIG. 6.
FIG. 8a illustrates the rear side mounting in the embodiment of FIG. 8.
FIG. 8b illustrates another rear side mounting design.
Figure 9:
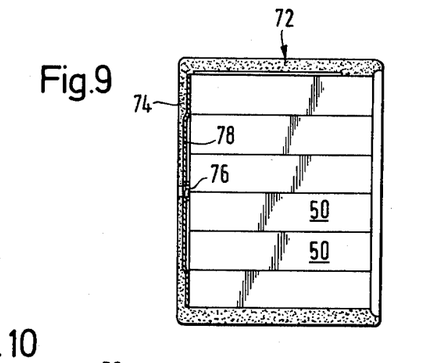
FIG. 9 is a vertical section similar to FIG. 8 of a fourth embodiment.

FIGS. 8 and 9 each illustrate embodiments similar to FIG. 1 but slightly modified.

A sheath 52 made of poly urethane foam is stretched about five containers 50. Sheath 52 has an inwardly protruding frame portion 54 at the rear side. The containers are pushed home via the front opening of the sheath 52 wherein they are secured by means of glue or held by friction only. The remainder of the open rear side is covered by a hard plastic plate 56 provided with a central hub 58 which, in turn, houses a nut member 60 secured against rotation.

FIGS. 8a and 8b, respectively, show two possibilities to fasten plate 56: In FIG. 8a, the individual cassette containers are provided with rear holes 62, and locking pins 64 engage into these holes from the inner face of plate 56. Moreover, webs 66 engage into respective apertures of sheath 52. In accordance therewith, the support may be dismantled again, but the containers 50a must have the said holes and therefore are different from the containers usually available on the market.

In the modification illustrated in FIG. 8b, the pins 64 are replaced by ribs 68 and the containers need not have holes. The ribs are provided at their edge facing the containers with energy concentrators 70 for the purpose of ultra sound welding. Upon this welding operation, the containers 50, the sheath, and the rear plate are integrally assembled to a unit.

FIG. 9 shows a modified embodiment. The sheath 72 covers the block of containers with a rear wall 74, too, and a metallic mounting plate 78 is immediately foamed into wall 74 which, as the entire sheath, consists of semi-hard polyurethane foam. Plate 78 has a central screw-threaded bore 76.

It is to be noted that, in contrast to FIG. 1, the front edge of the sheath extends—as in FIG. 8—beyond the front face of the cassette containers 50 and has a rounded profile to provide some upholstery.

Figure 10:
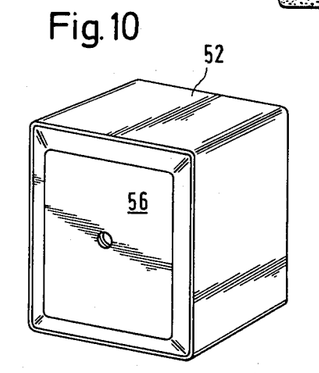
FIG. 10 is a rear view of the support shown in FIGS. 8 or 8a or 8b.

FIG. 10 illustrates isometrically the rear view of the support of FIG. 8 with the screw-threaded bore. In a similar manner, supports for 2×3—blocks similar to FIG. 7 may be designed, the rear view being shown in FIG. 11.

Figure 11:
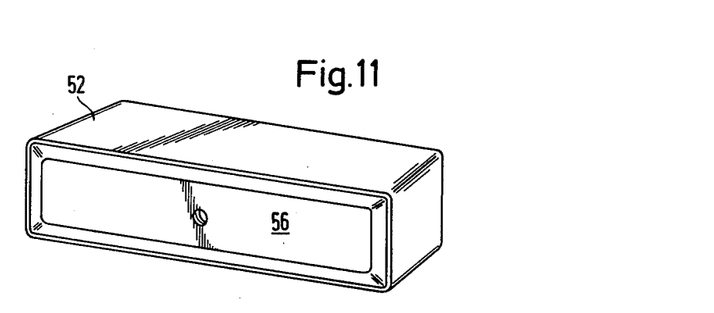
FIG. 11 is a rear view of a support similar to FIG. 7, however, with a rear side similar to FIGS. 8a or 8b.
Figure 12:
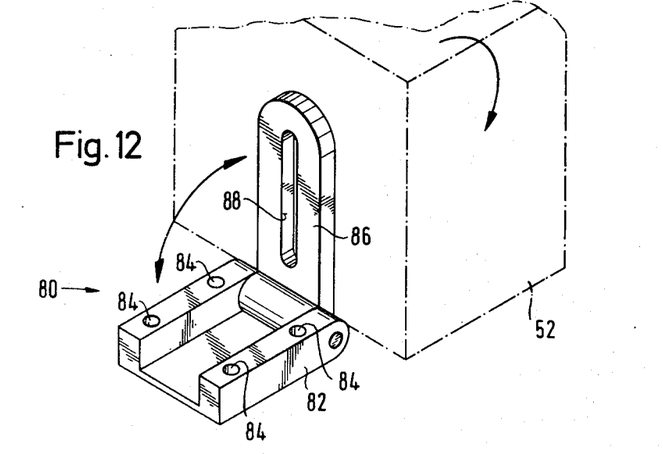
FIG. 12 is an isometric view of a mounting bracket for supports according to FIGS. 8-11, FIGS. 13a, 13b, 13c illustrate in front elevation different positions of the mounting bracket of FIG. 12.
Figure 13A:
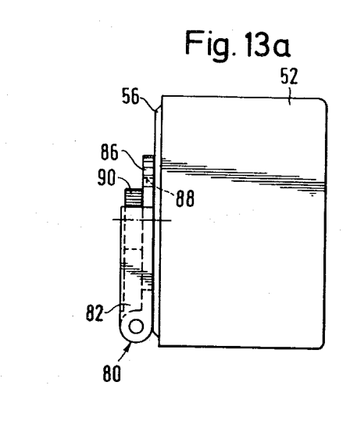
Figure 13B:
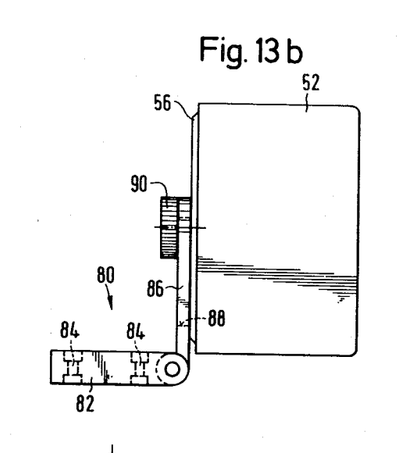
Figure 13C:
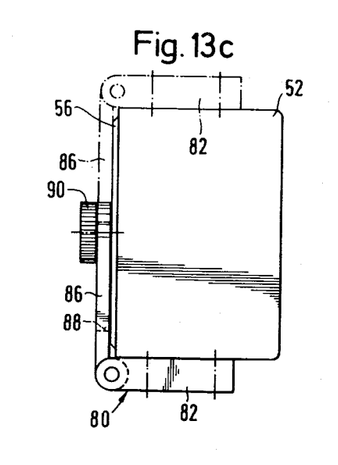

For the embodiments shown in FIGS. 8–11 a mounting bracket 80 illustrate in FIG. 12 is preferred. The bracket comprises a foot plate 82 having bolt holes 84—provided with countersunk bores as seen in FIG. 13b—and a carrier arm 86 pivotably connected to the foot plate. Carrier arm 86 has a slot hole 88 apt to permit passage of a mounting screw 90 the shaft of which is to be threaded into the bore of rear plate 58 78 or into nut 60. The screw head is preferably knurled and is illustrated in FIG. 13a-13c which illustrate some of the possible relative positions of bracket 80 and support. As indicated in FIG. 14, a connecting link 92 may be provided between foot plate and carrier arm.

The pivotable connection between foot plate and carrier arm should be apt to be locked in particular for use in a vehicle subjected to permanent vibrations. This will be explained in detail later.

Figure 15:
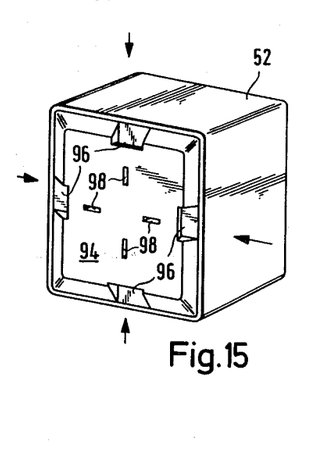
Figure 16:
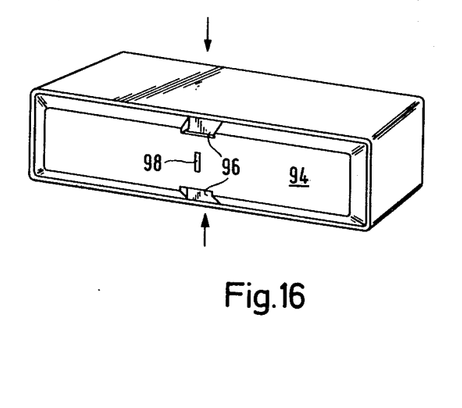
Figures 17, 18:
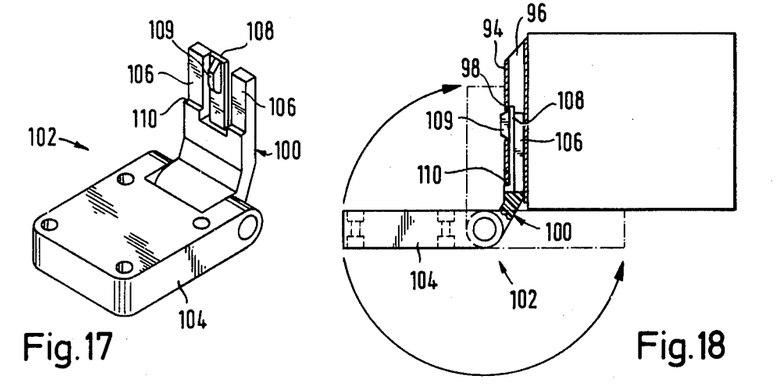
FIG. 17 is an isometric illustration of a mounting bracket for the supports of FIGS. 15 and 16.
FIG. 18 is a vertical section view of the mounting bracket of FIG. 17

At first, the embodiments of FIGS. 15 and 16 are to be presented; the illustrations correspond to those of FIGS. 10 and 11, resp. In these embodiments, rear plate 94 does not have a central thread bore but is provided at its four edges (FIG. 15) or at two opposite edges (FIG. 16) with insertion apertures 96 having a rectangular section shape, and in alignment with such apertures, a locking hole 98 is provided in the plate. A carrier arm 100 of a mounting bracket 102 fits into each such aperture 96. Bracket 102 is shown in FIGS. 17 and 18. It comprises a foot plate 104 pivotably connected to the carrier arm. The latter has two guide fingers 106 fitting into the respective insertion aperture, and it has moreover a resilient tongue 108 flexed during insertion but apt to engage with its nose 109 into the aligned hole 98. A ledge 110 serves as a stop means. Foot plate and carrier arm are made of plastic but could be made of metal, too.

Figure 14:
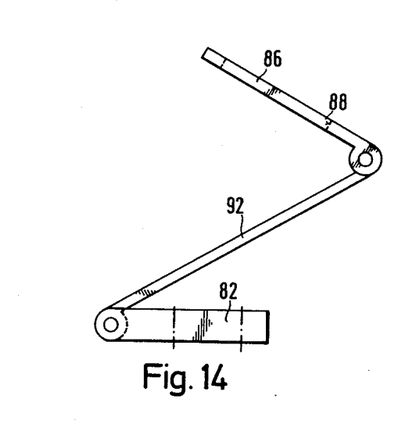
FIG. 14 shows somewhat schematically a front elevation of a mounting bracket of supports shown in FIGS. 8-11, FIG. 15 and 16 are rear views supports having a modified rear side but otherwise similar to FIGS. 10 and 11, resp.
Figures 19, 20:
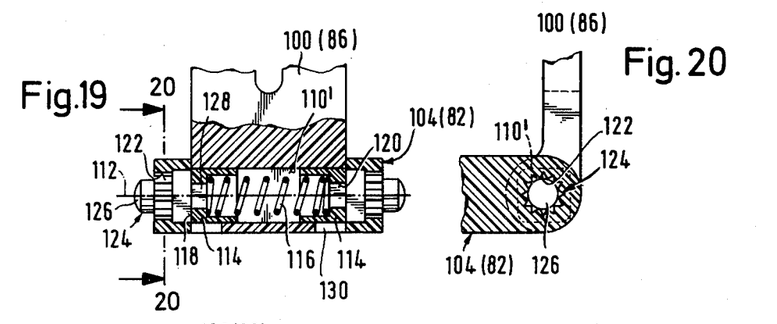
FIG. 19 is a section along the axis of the bracket shown in FIG. 17.
FIG. 20 is a section along line 20—20 of FIG. 19.

As in the embodiments of FIGS. 12-14, the pivots should be lockable in these designs, too. FIGS. 19 and 20 illustrate lock mechanisms suited for this purpose.

Carrier arm 100 (or 86) is provided with a hole extending aligned with the pivot axis therethrough, the hole having a rectangular or otherwise non-circular section shape. Two plugs 114 having a section profile mating that of the holes are slidably received in said holes and are pushed outwards by compression spring 116. The outer faces 118 of the plugs 114 have non-circular, preferably square-sectioned indentations 120. Foot plate 104 (or 82) has holes 122 concentrical with respect to axis 112 and of star-shaped section, these star-holes receiving pins 124 of complementary section shape. From each pin 124, a pressure button 126 of cylindrical shape extends outwards, the cylindrical portion having a diameter that the button is freely rotatable in the respective star-hole 122. A protuberance 128 of each pin 124 engages drivingly into the allocated indentation 120 of the plug 114.

Figures 21, 22:
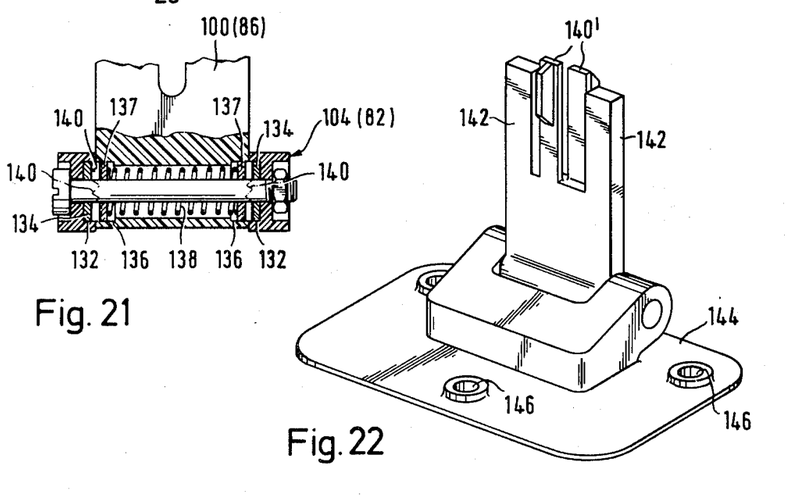
FIG. 21 is a section view similar to FIG. 19 but of another embodiment.
FIG. 22 shows isometrically a modified embodiment of a bracket as illustrated in FIG. 17.

Upon exerting pressure on both buttons 126 simultaneously so to compress spring 116, foot plate and carrier arm may be rotated relative to each other. Pressure removal causes the pins to slide back into the star holes thereby preventing further rotation. Cut-away portions at the bottom side of the foot plate facilitate assembling of the device. The embodiment of FIG. 21 is slightly modified metal discs 134 are mounted in each foot plate indentation 132 and are secured against rotation. Counter discs having radial teeth complementary to radial teeth of said discs 134 and in engagement therewith are secured against rotation in carrier arm indentations 136, the counter discs being designated with 137. These are pushed against discs 134 by compression spring 138. The teeth of both discs 134, 137 are designed such that under torque about the pivot axis exerted manually the teeth disengage and permit relative rotation of carrier arm and foot plate, spring 138 being further compressed during movement. For this purpose, the flanks of teeth 140 have a relatively flat slope. The foot plate may be mounted by means of screw bolts but may as well be fastened by means of glue, films covered at both their faces with a bonding material being available on the market for such purposes.

FIG. 22 illustrates a modification of such a mounting bracket wherein the foot plate 144 is made of a flexible material, for example, soft nylon. The foot plate is relatively thin and may assume the configuration of a non-planar surface to which the foot plate is to be bonded. In lieu of the one resilient tongue 108 , a pair of anti-symmetric resilient tongues 140' is provided so that the support may be fixed in either position and locked. In this design, the upper faces of the fingers 142 serve as a stop means. The foot plate 144 may be provided with holes 146 for eventual mounting by means of screw bolts.

Figure 23:
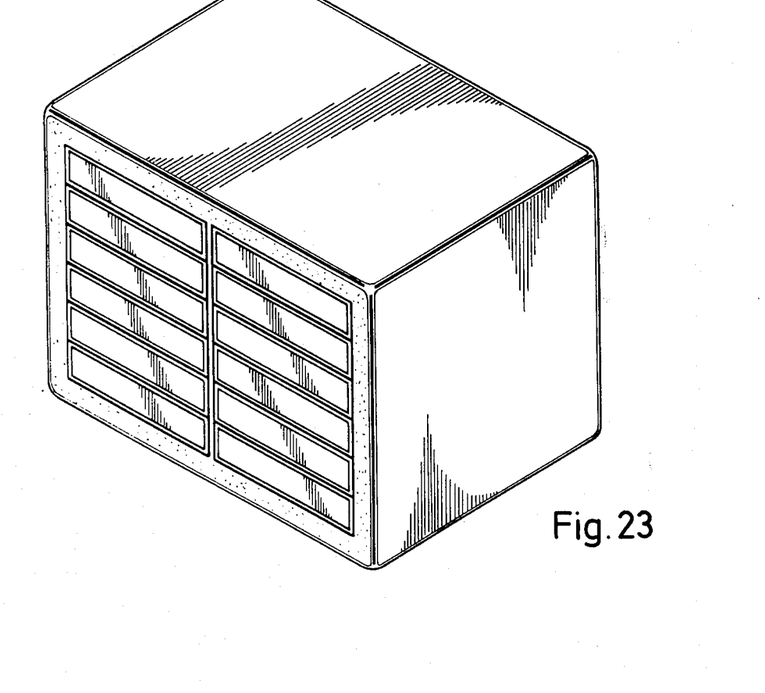
FIG. 23 shows isometrically a support similar to FIG. 1 but for another type of cassette container.
Figure 24:
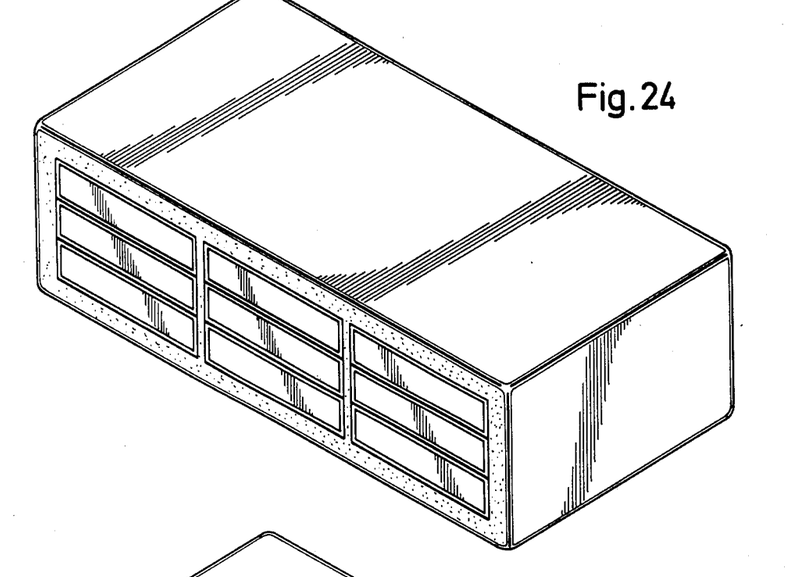
FIG. 24 shows isometrically a support similar to FIG. 7 but for another type of cassette container.
Figure 25:
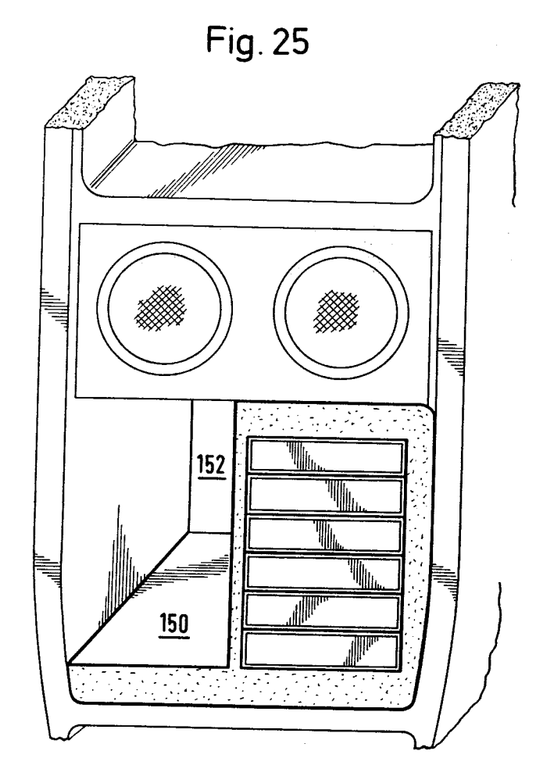
FIGS. 25 to 29 show isometrically embodiments of supports in accordance with the invention mounted in the central cockpit frame member of a vehicle.
Figure 26:
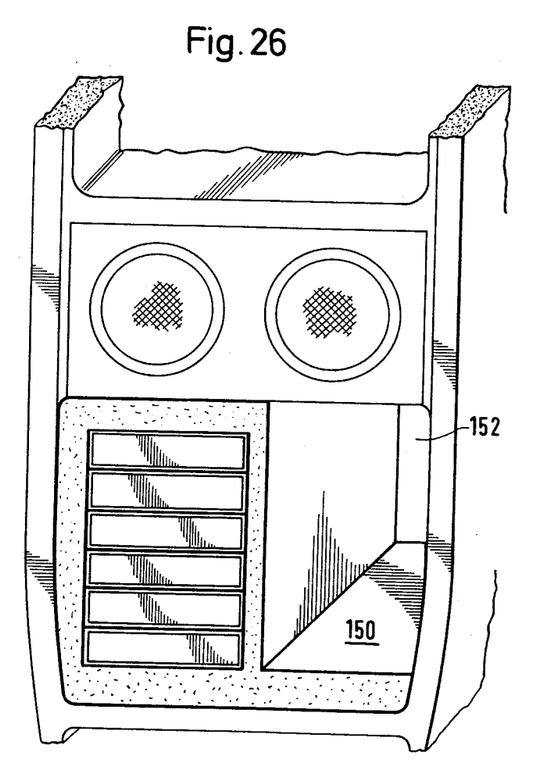
Figure 27:
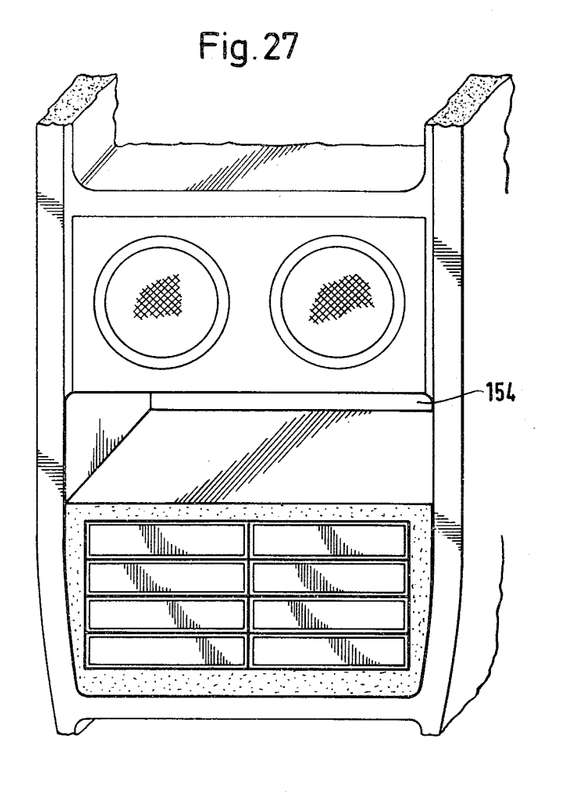
Figure 28:
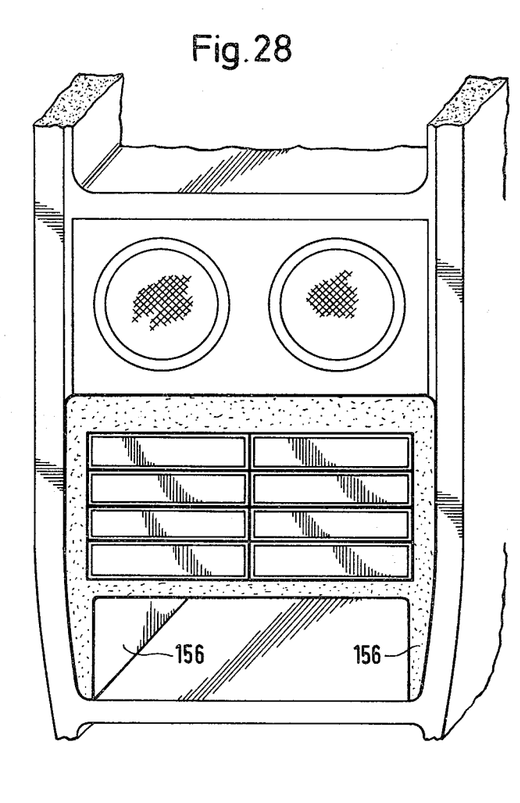

While the embodiments described so far had dimensions adapted to receive the usual cassette tape containers, supports in accordance with the invention may as well be used with containers of other type provided the have closure means permitting removal of the cassette to the front. The front face of cassette tape containers have dimensions of about $18 \times 116$ mm² with a depth of the container of about 80 mm so that an appearance will result as illustrated in FIGS. 1, 6, 7, or 8. Containers having a greater depth but a smaller front face may also fit in a support as disclosed, such support, of course, having respectively amended dimensions. Supports fitted with respectively twelve and nine containers each having a front face of about $11 \times 70$ mm² are illustrated in FIGS. 23 and 24, respectively.

Figure 29:
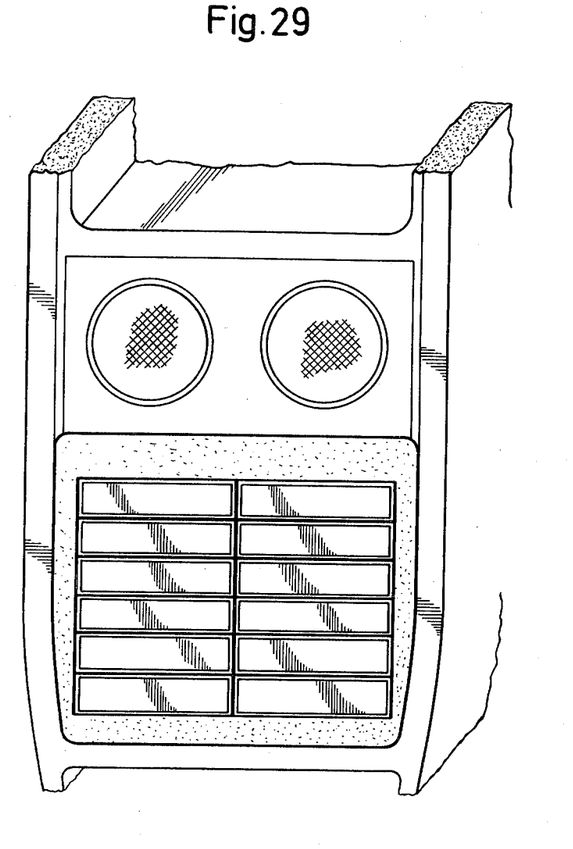

The same type of containers are also housed in the embodiments illustrated in FIGS. 25–29. The supports are designed such that they fit in the protruding wall portion which is hollow and permanently mounted in the cockpit of a vehicle. Integrally formed with the sheath there are provided fitting webs 150, 152, 154 and 156, respectively unless—as shown in FIG. 29—the sheath just fits in the hollow space of the wall member. Mounting elements may be clamping clips mating with stop lugs at the support sheath, and/or ordinary screws.

I claim:

1. A support arrangement for a plurality of containers each adapted to house a magnetic tape cassette which may be removed from the container through an opening at the front thereof, said plurality of containers defining a substantially rectangular block having a front face in which said openings are located, and the block also having a first pair of opposite top and bottom sides and a second pair of opposite lateral sides adjoining the top and bottom sides, the top, bottom and lateral sides defining the circumference of the block, and the block also having a back side opposite the front face, the arrangement comprising a broad and flat sheath of elastic material in a closed loop stretched about the circumference of the block of cassette containers and extending substantially from the back side to the front face of the block and leaving the front openings of the containers uncovered, the elastic sheath engaging at least one pair of opposite sides of the block of containers in frictional gripping relation and holding the containers together in substantially unremovable relationship to each other, and mounting means for releasably connecting the block of containers to a holder, said mounting means disposed at one of the sides of the block of containers whereby to allow continued access into the containers through the front openings thereof.

2. A support as set forth in claim 1 wherein said mounting means comprise a substantially U-shaped bracket having legs disposed between said block and said sheath and a U-base adjacent said back side, the U-base being provided with connecting elements.

3. A support arrangement as set forth in claim 2 wherein said connecting elements comprise indentations in said U-base and that said holder comprises a connecting member adapted to fit into said indentations.

4. A support arrangement as set forth in claim 3 wherein the holder is a flexible column having said connecting member at its upper end.

5. A support arrangement as set forth in claim 4 wherein said column has at its end adjacent the one U-leg a carrier member of substantially plate-like configuration and a holding plate extending under an angle from said carrier member and adapted to fit into a guide opening of said U-base.

6. A support arrangement as set forth in claim 5 wherein said holder plate is releasably locked in said U-base by means of a snap-fit connection.

7. A support arrangement as set forth in claim 5 wherein the holder plate is frictionally rotatable with respect to said column.

8. A support arrangement as set forth in claim 1 wherein said elastic sheath is made of foamed plastic material.

9. A support arrangement as set forth in claim 8 wherein said foamed plastic material presents a contiguous skin at least at the outer periphery of said sheath.

10. A support arrangement as set forth in claim 1 wherein said mounting means for releasable connection to the holder comprise a plate at the back side of the block.

11. A support arrangement as set forth in claim 10 wherein said plate has a central bore.

12. A support arrangement for a plurality of containers each adapted to house a magnetic tape cassette which may be removed from the container through a front opening thereof, the containers being juxtaposed and/or superposed to define a substantially rectangular block presenting the front openings of all containers at one side thereof, comprising a flat sheath of elastic material stretched about at least four of the remaining five block sides, the sheath being provided, at least at one of said remaining sides, with means for releasable connection to a holder, said means comprising a plate at the block side opposite said one side, said plate having a central threaded bore, said plate forming a mounting bracket having a carrier arm adapted to be fastened by screw means in said threaded bore and having a foot plate pivotable relative to said carrier arm.

13. A support arrangement as set forth in claim 12 wherein said foot plate is flexible permitting its adaptation to a non-planar mounting surface.

14. A support arrangement as set forth in claim 10 wherein said plate has insertion openings and locking apertures for a carrier arm of said holder.

15. A support arrangement as set forth in claim 14 wherein said carrier arm is pivotably connected to a foot plate.

16. A support arrangement as set forth in claim 15 wherein said foot plate is flexible permitting its adaptation to a non-planar mounting surface.

17. A support arrangement as set forth in claim 14 wherein said carrier arm has at least one resilient tongue adapted to snap into one of said locking apertures.

18. A support arrangement as set forth in claim 12 wherein said pivotable connection between said carrier arm and said foot plate is lockable.

19. A support arrangement as set forth in claim 18 wherein the lockable connection is adapted to be manually unlocked.

20. A support arrangement as set forth in claim 19 wherein said lockable connection is adapted to be manually unlocked without the need of any tool.

21. A support arrangement as set forth in claim 12 wherein a link member is provided between said carrier arm and said foot plate and pivotably connected to both.

22. A support arrangement as set forth in claim 10 wherein said sheath is provided with inwardly projecting frame portions adjacent said back side of the block.

23. A support arrangement as set forth in claim 22 wherein said plate has locking pins extending in the direction of said block and are snap-fittedly engaged in holes provided in adjacent rear walls of said containers.

24. A support arrangement as set forth in claim 19 wherein said sheath has a substantially complete rear wall at the back side of the block, said plate being disposed between said sheath rear wall and said block.

25. A support arrangement as set forth in claim 22 wherein said plate is provided with lugs extending in toward said block and welded to adjacent rear walls of said containers.

26. A support arrangement as set forth in claim 23 or claim 25 wherein said plate has web members extending in direction to said block and engaged in apertures of said sheath.